(12) United States Patent
Knox

(10) Patent No.: US 6,181,386 B1
(45) Date of Patent: *Jan. 30, 2001

(54) PROJECTING IMAGES

(75) Inventor: Richard M. Knox, Houston, TX (US)

(73) Assignee: Duke University, Durham, NC (US)

( * ) Notice: Under 35 U.S.C. 154(b), the term of this patent shall be extended for 0 days.

This patent is subject to a terminal disclaimer.

(21) Appl. No.: 08/767,967

(22) Filed: Dec. 17, 1996

Related U.S. Application Data

(63) Continuation-in-part of application No. 08/581,108, filed on Dec. 29, 1995.

(51) Int. Cl.$^7$ .................................................. H04N 5/74
(52) U.S. Cl. ........................... 348/788; 348/781; 353/77; 353/98
(58) Field of Search .................... 348/744, 756, 348/779, 780, 781, 786, 787, 789; 353/78, 74, 99, 77, 98, 37, 119, 20, 47, 50; 349/4, 5; 359/494, 630; H04M 5/72, 5/74, 9/31

(56) References Cited

U.S. PATENT DOCUMENTS

| | | | |
|---|---|---|---|
| 4,969,732 | 11/1990 | Wright | 353/77 |
| 5,172,221 | 12/1992 | Ko | 359/53 |
| 5,193,015 | 3/1993 | Shanks | 359/53 |
| 5,223,869 | 6/1993 | Yanagi | 353/77 |
| 5,467,154 | 11/1995 | Gale et al. | 353/77 |
| 5,557,343 | 9/1996 | Yamagishi . | |
| 5,573,324 | 11/1996 | De Vaan | 353/77 |
| 5,692,820 | 12/1997 | Gale et al. | 353/119 |
| 5,833,360 | * 11/1998 | Knox et al. | 362/293 |

FOREIGN PATENT DOCUMENTS

| | | | |
|---|---|---|---|
| 0 488 590 A1 | 3/1992 | (EP) | G02B/27/00 |
| 0 657 769 A1 | 6/1995 | (EP) . | |
| 3-243932 | 10/1991 | (JP) | G03B/21/00 |

OTHER PUBLICATIONS

European Search Report, May 15, 1997.

Murty et al., "Simple Catadioptic Magnifiers," *Optical Engineering*, Jan/Feb., 1983, vol. 22, No. 1, pp. 149–152.

Murty et al., "Catadioptic Magnifiers," *Optical Engineering*, Nov./Dec., 1980, vol. 19, No. 6, pp. 915–917.

Murty et al., "Microfiche Reader Using a Plano–Convex Lens," *Centro de Investigaciones en Optica*, 1982 Annual Meeting, Opticas Society of America, p. 1827.

Shannon & Wyant, "Applied Optics and Optical Engineering," *Academic Press*, Inc., 1983, pp. 244–249.

\* cited by examiner

*Primary Examiner*—Michael H. Lee
(74) *Attorney, Agent, or Firm*—Fleshner & Kim, LLP

(57) ABSTRACT

An "extra-folded" projection display system includes a selectively reflective material (e.g., a linear reflecting polarizer) placed immediately behind the system's imaging screen. The display system includes an image projector that projects an image beam containing light of a predetermined linear polarization toward the imaging screen. The linear reflecting polarizer reflects the light in the image beam away from the screen. The reflected image beam then encounters a ¼-wavelength achromatic retarder which converts the linear polarization to circular polarization. The image beam next hits a mirror that reflects the light back through the ¼-wavelength achromatic retarder, which converts the circular polarization back to linear polarization, with the polarization director rotated 90° from the original polarization director. The linear reflecting polarizer then allows the light to pass through to the image screen.

21 Claims, 16 Drawing Sheets

PROJECTING IMAGES

This application is a continuation-in-part of U.S. application Ser. No. 08/581,108 filed Dec. 29, 1995.

BACKGROUND OF THE INVENTION

1. Field of the Invention

The invention relates to projecting images.

2. Description of the Related Art

Referring to FIG. 1, light projectors are used, for example, to display images on large surfaces, such as movie or television screens. In a front projection system 20, an image beam 24 is projected from an image source 21 onto the "front" side of a reflection-type angle transforming screen, which then reflects the light toward a viewer 27 positioned in front of the screen. In a rear projection system, the image beam is projected onto the "rear" side of a transmission-type angle transforming screen 26 and transmitted toward a viewer 29 located in front of the screen.

Due to the physical properties of light, the size of the image beam 24 when it reaches the screen 26 depends upon the magnification rate of the image source 21 and the distance between the screen 26 and the image source 22. To efficiently utilize the screen 26, the image beam 24 should just fill the entire height S and width (not shown) of the screen 26. In FIG. 1, the image beam 24 fills the screen 26 when the source 22 is at an appropriate distance D from the screen 26, i.e., when the center of the image beam 24 follows an optical path 28 of length D. The optical path length D depends upon the screen height S and the magnification rate of the image source. Any non-transparent object placed in the path of the image beam 24 typically will obstruct the image beam 24 and form a shadow on the screen 26.

Referring to FIG. 2, designers have reduced the size of the typical image projection system 30 by "folding" the optical path of the projected image beam to reduce the apparent projection length L of the system 30. The "folded" system 30 includes one or more mirrors 34, 36 placed at strategic points along the optical path to redirect the projected image and to form multiple optical subpaths D1, D2, D3. The overall system configuration in this optical system 30 is more rectilinear than the conical system configuration of FIG. 1.

In the folded image projection system 30, assuming that the image source 40 and the screen 32 are similar to those in FIG. 1, the image 38 fills the screen 32 entirely when the mirrors 34, 36 are positioned such that the combined length of the optical subpaths D1, D2, and D3 equals the optical path length D in FIG. 1, even though the apparent projection length L is less than D.

SUMMARY OF THE INVENTION

An "extra-folded" projection display system includes a selectively reflective material (e.g., a linear reflecting polarizer) placed immediately behind the system's imaging screen. The display system includes an image projector that projects an image beam containing light of a predetermined linear polarization toward the imaging screen. The linear reflecting polarizer reflects the light in the image beam away from the screen. The reflected image beam then encounters a ¼-wavelength achromatic retarder which converts the linear polarization to circular polarization. The image beam next hits a mirror that reflects the light back through the ¼-wavelength achromatic retarder, which converts the circular polarization back to linear polarization, with the polarization director rotated 90° from the original polarization director. The linear reflecting polarizer then allows the light to pass through to the image screen.

Embodiments of the invention may include the following features. The system may include a powered optical element to further increase the "folding" of the image beam, change the magnification rate, provide distortion correction, or optimize packaging. The image beam may be folded even further by allowing it to reflect from the mirror twice and to pass through the achromatic retarder four times. The mirror may be positioned between the image source and the imaging screen.

Advantages of the invention may include one or more of the following. An optical element placed immediately behind the screen in a projection imaging system may act as a "mirror" that increases the amount of folding that the light undergoes and therefore may reduce the apparent projection length, or depth, of the system to a greater extent than previously possible. The image source may be placed behind all optical elements in the display system, further reducing the size of the system.

Other advantages and features will become apparent from the following description and from the claims.

DETAILED DESCRIPTION OF THE PREFERRED EMBODIMENTS

Figure 1:
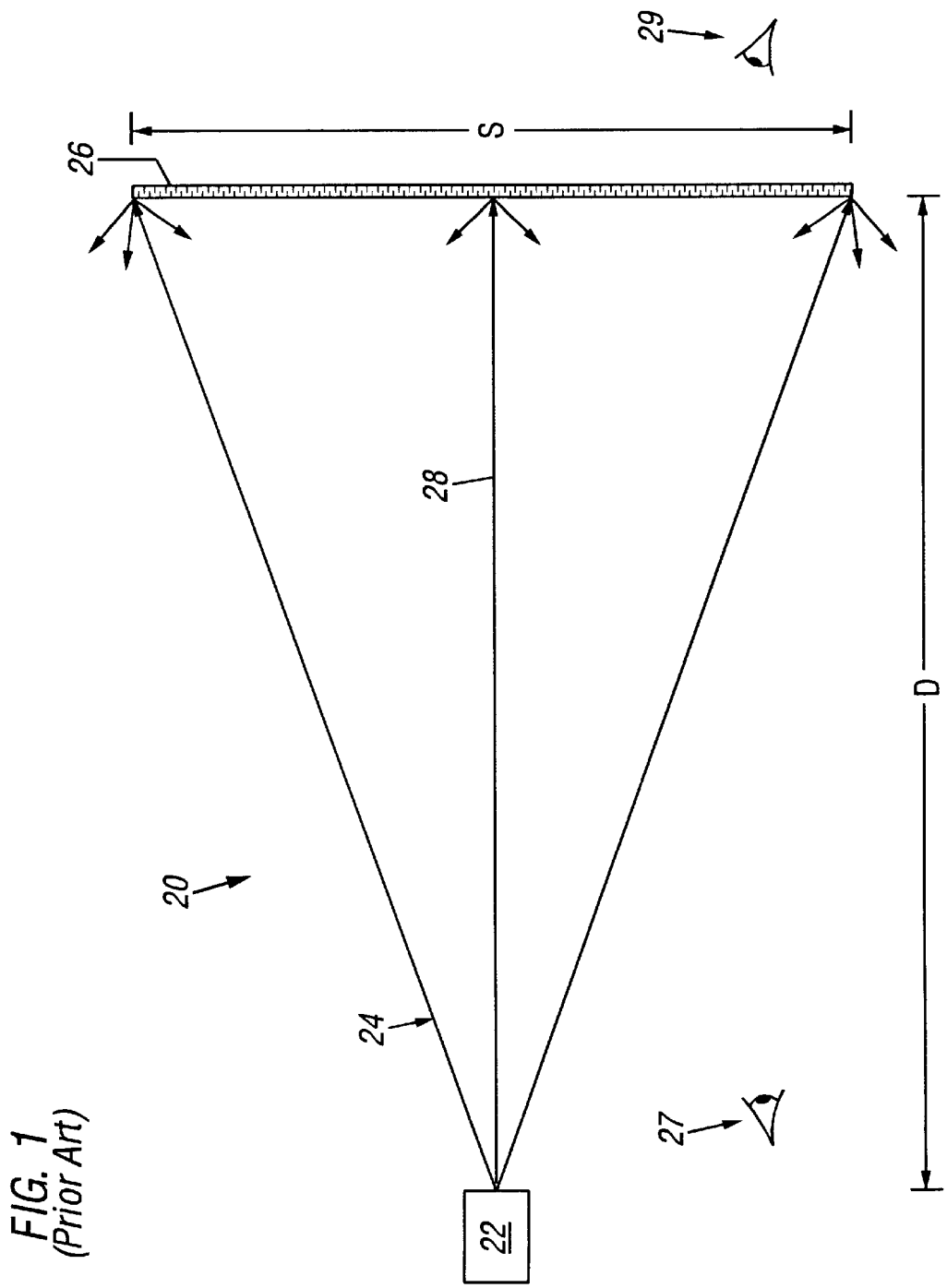
FIG. 1 is a side view of a prior art projection display system.
Figure 2:
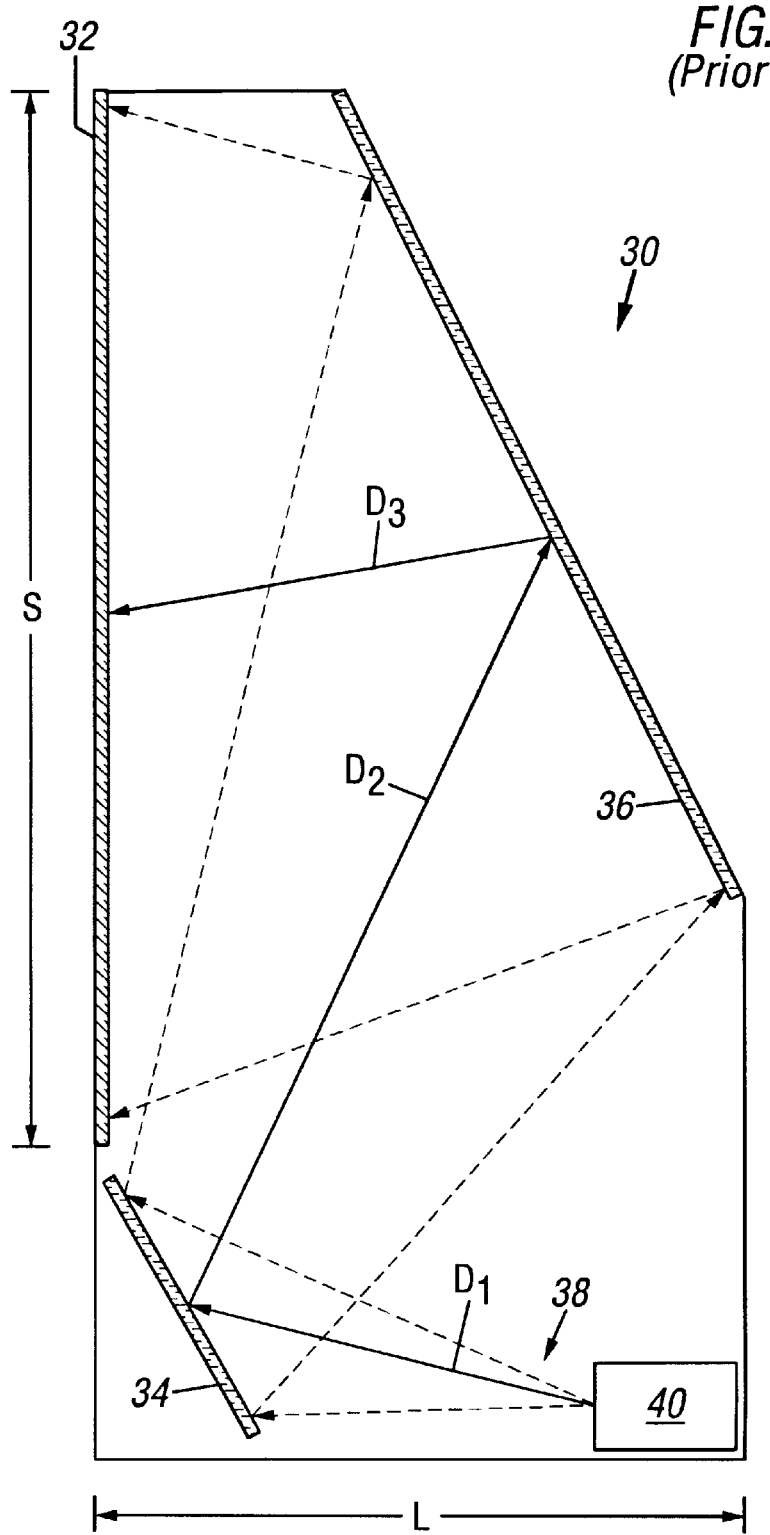
FIG. 2 is a side view of a prior art folded projection display system.
Figure 3:
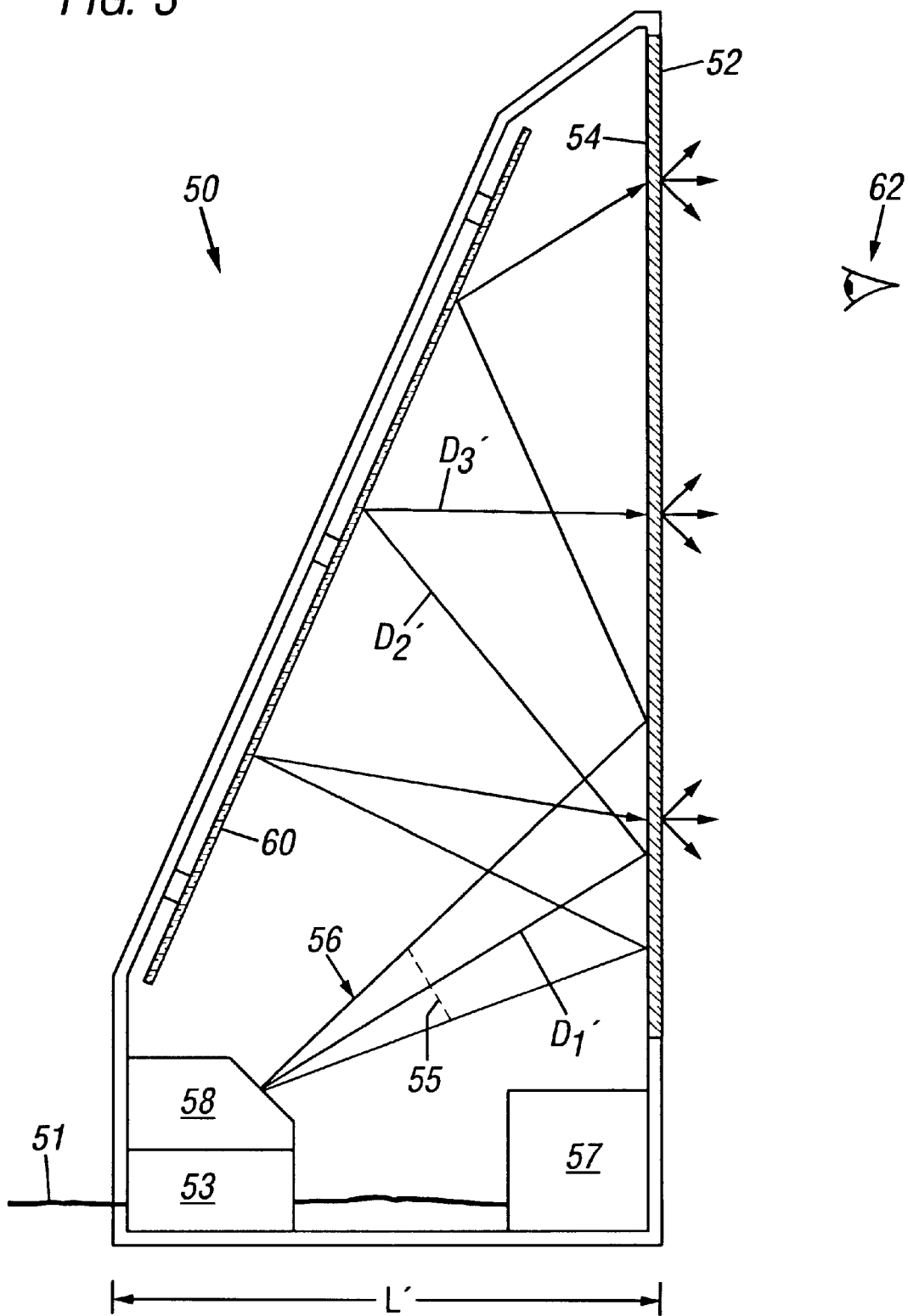
FIGS. 3, 4, and 5 are side views of an "extra-folded" projection display system.

Referring to FIG. 3, an "extra-folded" projection video system 50, such as a projection television, includes a diffusive screen 52 having a surface 54 that is covered by a selectively reflective or transmissive material. The selectively reflective or transmissive surface 54 allows the screen 52 to act at times as a mirror and at times as a transmissive imaging screen. As a result, an image 55 contained in an image beam 56 projected by an image projector 58 reflects from the rear surface 54 of the screen the first time it encounters the surface 54. The image beam 56 then travels toward a mirror 60 located behind the screen 52, which in turn reflects the light 56 back toward the screen 52. When the image 55 in the image beam 56 encounters the rear surface 54 of the screen 52 the second time, the image 55 passes through the screen 52 toward the viewer 62.

In this manner, the screen 52 essentially acts as a "mirror" placed directly between the viewer 62 and the rear mirror 60. The screen 52 reflects the image beam 56 away from the viewer but does not block the image beam 56 or significantly deteriorate the quality of the image 55 seen by the viewer. Because a "mirror" is placed at a position along the optical path that previously had to be free from such objects, the image beam 56 projected from the image source 58 is "extra-folded", i.e., folded more often and over a much smaller linear distance L' than is possible with existing systems.

The projection system 50 receives an electronic signal through an input cable 51 and provides it to a signal splitter 53. The signal splitter 53 divides the electronic signal into a video signal and an audio signal and provides these signals to the image source 58 and a sound system 57, respectively. The image source 58 converts the video signal into light and projects the light as an image beam 56. The image source 58 may be any type of image projection engine, such as a liquid crystal display ("LCD")projector. The electronic signal may be any type of signal containing video information, such as a television signal received by an antenna or over cable lines or a computer video signal received through a computer video cable. The audio signal and the sound system 57 are optional.

Figure 4:
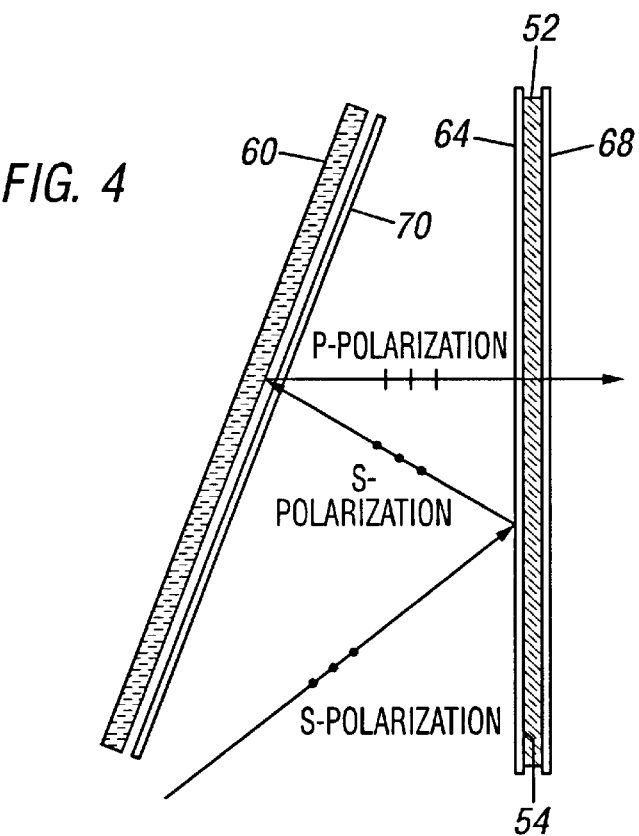

Referring also to FIG. 4, the screen 52 is able to act as a mirror at some times and as an imaging screen at other times because its rear surface 54 is covered by a linear reflecting polarizing material, such as Minnesota Mining & Manufacturing Company's double brightness enhancement film (DBEF) material. The linear reflecting polarizing material forms a polarizer 64 that transmits substantially all light linearly polarized in one direction (the "direction of transmission")and reflects substantially all light linearly polarized in a direction orthogonal to the direction of transmission. For example, if the linear reflecting polarizer 64 is oriented to transmit p-polarized light, it reflects substantially all s-polarized light because s-polarized light is orthogonal to the polarizer's direction of greatest transmissive efficiency. Conversely, when p-polarized light encounters the polarizer 64, substantially all of the light passes through the polarizer 64 and the diffusive screen 52 toward the viewer because the p-polarized light is aligned in the direction of the polarizer's greatest transmission efficiency.

The linear reflecting polarizer should have a transmission efficiency of at least 99%, so that less than 1% of s-polarized light escapes the projection system and all but 1% of p-polarized light is projected to the viewer. A linear absorption polarizer 68 may be used to further filter improperly polarized light from the image beam. Both the reflecting polarizer 64 and the absorption polarizer 68 may be attached to the screen 52 (e.g., by an index matching glue) or may be suspended in the display system (e.g., by a one or more frames connected to the system's housing).

Figure 5:
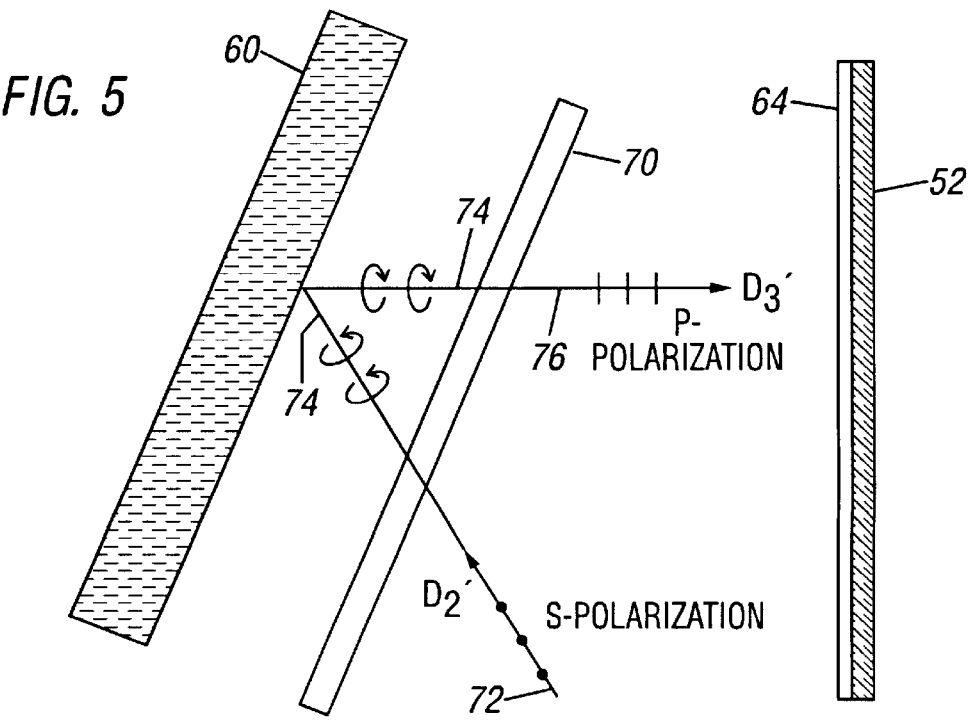

Referring also to FIG. 5, the polarization of the light traveling between the image source 58 and the imaging screen 52 is altered by a ¼-wavelength achromatic retarder 70 positioned between the imaging screen 52 and the rear mirror 60. The retarder 70 may be attached to the front surface of the mirror 60 or suspended in the system by other means.

The ¼-wavelength achromatic retarder 70 comprises a material that delays one linear component of a light wave passing through it by ¼-wavelength. Such a material is produced by Nitto Denko Corporation of Japan under the name WB-¼, and similar materials are available from other sources. Therefore, the retarder 70 transforms linearly polarized light into circularly polarized light and transforms circularly polarized light into linearly polarized light. Furthermore, light that twice passes through the retarder 70 has the same linear component delayed twice, or by ½-wavelength. So linearly polarized light passing through the retarder 70 two times emerges with a polarization orthogonal to that at which it began.

For example, s-polarized light 72 travelling along optical sub-path $D_2'$ is transformed into circularly polarized light 74 when it passes through the achromatic retarder 70. After reflecting from the second mirror 60, the circularly polarized light 74 becomes p-polarized light 76 when it passes through the retarder 70 again. The p-polarized light 76 then travels along optical sub-path $D_3'$ and eventually passes through the linear reflecting polarizer 64 and onto the diffusive imaging screen 52.

Figure 6A:
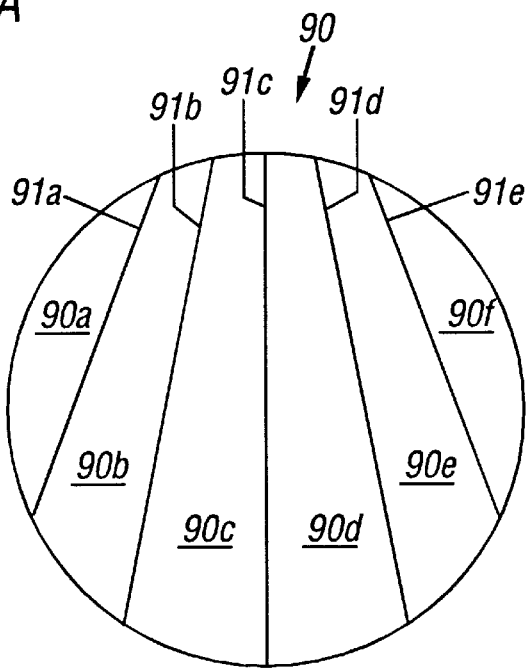
FIGS. 6A and 6B are "patchwork" polarizers that may be used in the system of FIGS. 3, 4, and 5.
Figure 6B:
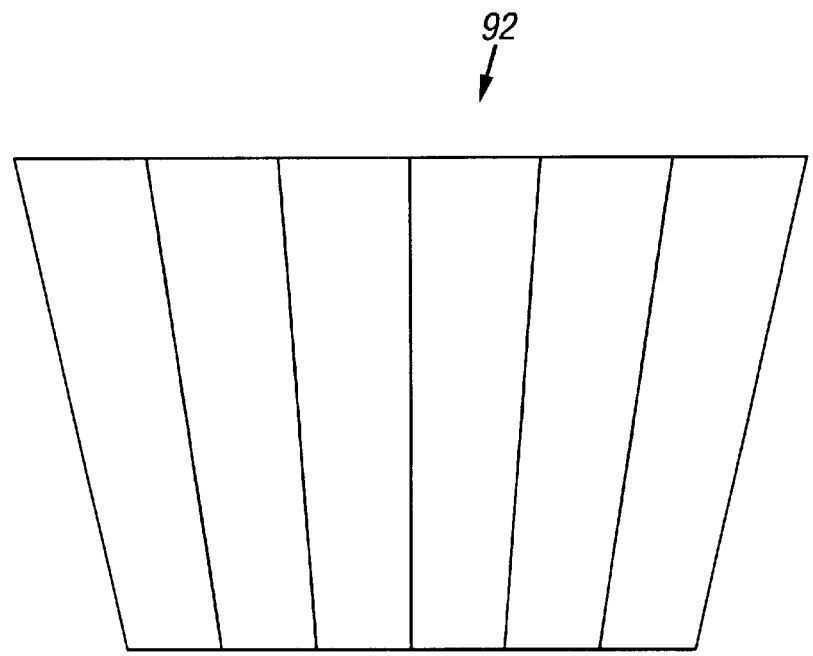

Referring also to FIGS. 6A and 6B, the "extra-folded" projection system can include a "patchwork" polarizer 90 or 92 that compensates for trapezoidal distortions occurring when the image is reflected in the system. The linear reflecting polarizing material 64 may be slightly sensitive as to the incoming angle of the light. That is, the polarization of the reflected light may not be perfectly s-polarized but may be slightly circular. The patchwork polarizer 90 or 92 compensates for this potential condition. The patchwork polarizer 90 or 92 may be located anywhere between the image source 58 and the last reflective element in the system.

The "patchwork" polarizer 90 of FIG. 6A may be placed within the image source 58 (FIG. 3), such as on the surface of the lens that typically forms the last stage of an LCD projector. The substantially circular polarizer 90 is a linear absorption polarizer having several regions 90a–90f with different transmissive properties. Each pair of adjacent regions is divided by a linear boundary 91a–91e extending through the polarizer 90. The polarizer 92 of FIG. 6B may be placed on one of the reflective surfaces in the display system and preferably is incorporated into the DBEF material of the linear reflecting polarizer 64 (FIG. 4) on the system's display screen 52. The transmissive properties, size, and shape of each region in the patchwork polarizer 90 or 92 are determined by the structure of the display system and, in particular, by the trapezoidal distortions imparted by the system.

Figure 7A:
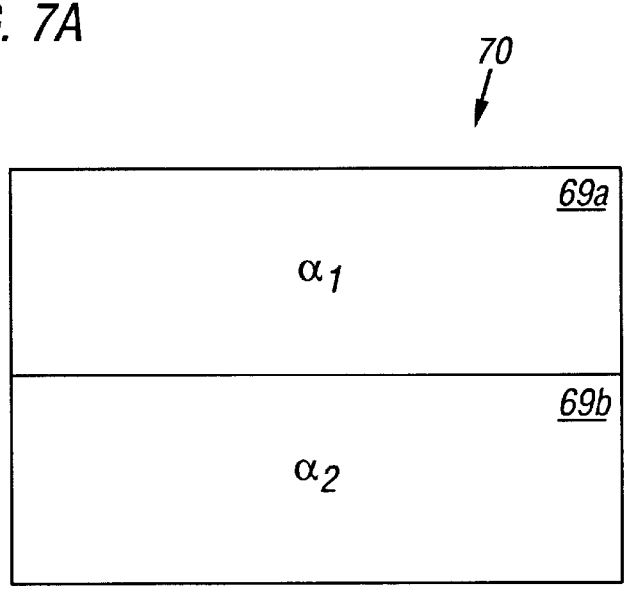
FIGS. 7A, 7B, and 7C are specialized achromatic retarders that may be used in the system of FIGS. 3, 4, and 5.
Figure 7B:
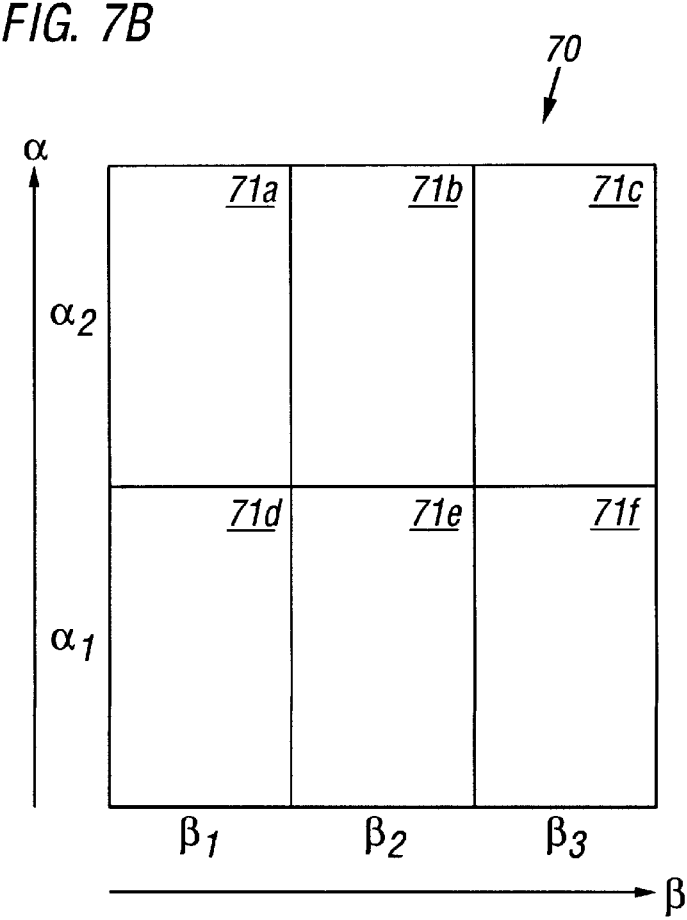
Figure 7C:
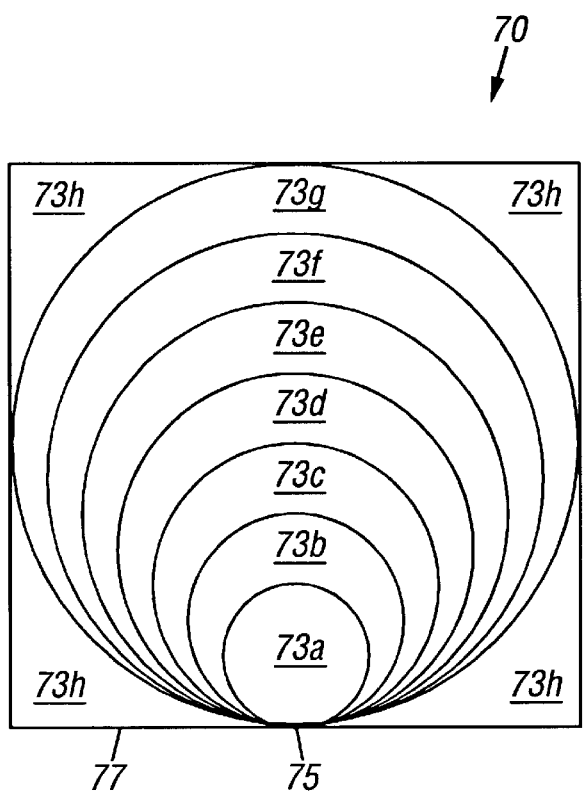

Referring to FIGS. 7A, 7B, and 7C, the achromatic retarder 70 can be constructed to accommodate the varying angles of incidence at which light from the image source 58 impinges upon the retarder 70. If the image source is located below the page and toward the reader, light from the image source will hit the page at higher angles of incidence on the lower half of the page and at lower angles of incidence on the upper half of the page. Likewise, if the image source is positioned below the center of the page, light from the source will hit the page at higher angles of incidence on the center of the page and at lower angles of incidence on the left and right edges of the page. Because the retarder's effect on a particular light ray may depend upon the angle of incidence at which the light ray strikes the retarder, the retarder 70 can consist of several regions having different retardation properties.

As shown in FIG. 7A, the retarder 70 may be divided into two regions 69a, 69b having two different retardation values $\alpha_1$ and $\alpha_2$. Region 69a accommodates light passing through the retarder 70 at lower angles of incidence, and region 69b accommodates light passing through at the higher angles of incidence. Referring to FIG. 7B, the retarder instead may be divided into a linear grid having, e.g., two retardation values $\alpha_1$ and $\alpha_2$ along a vertical axis $\alpha$ and three retardation values $\beta_1$, $\beta_2$, and $\beta_1$ along a horizontal axis $\beta$. The retarder 70 then is divided into six sections 71a–71b, the retardation value for each of which is determined by the corresponding vertical value $\alpha_1$ or $\alpha_2$ and the corresponding horizontal value $\beta_1$, $\beta_2$, or $\beta_3$. Alternatively, as shown in FIG. 7C, the retarder 70 may be divided into several substantially circular or elliptical regions 73a–73h intersecting at the center point 75 of the retarder's bottom edge 77. The innermost region 73a accommodates light passing through the retarder 70 at the highest angles of incidence and the outermost region 73h accommodates light passing through the retarder 70 at the lowest angles of incidence. A retarder manufacturer (e.g., Nitto Denko Corporation of Japan) can create an appropriate retarder given the structure and dimensions of the projection display system.

Figure 8:
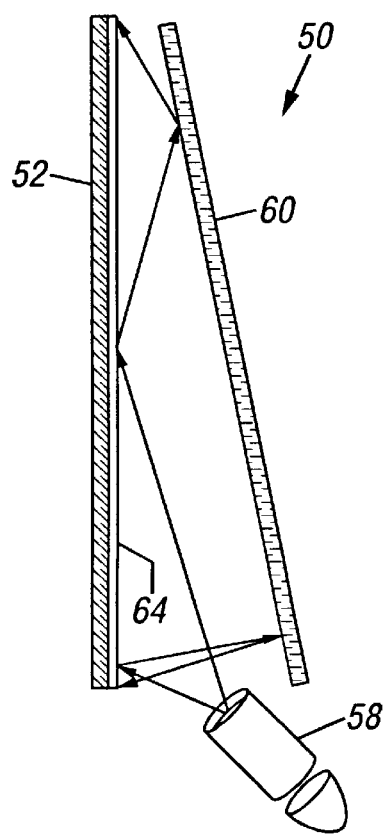
FIGS. 8, 9, and 10 are side views of alternative "extra-folded" projection video systems.
Figure 9:
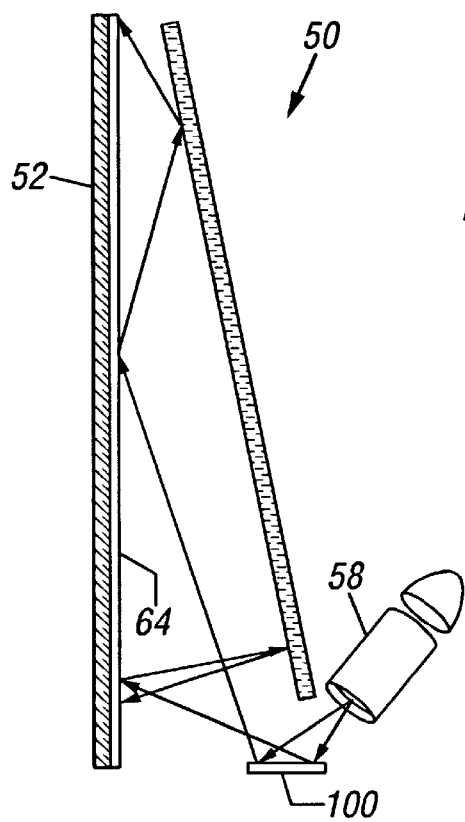

Referring to FIGS. 8 and 9, the "extra-folded" projection display system 50 may be constructed with various spacial configurations. In the system of FIG. 8, the image source 58 projects an image beam directly onto the linear reflecting polarizer 64, which first reflects the image beam toward the achromatic retarder 70 and then allows the reflected image beam to pass to the imaging screen 52. In the system of FIG. 9, the image source 58 is located behind the mirror 60. The image source 58 projects an image beam downward onto a smaller mirror 100 that in turn reflects the image beam toward the linear reflecting polarizer 64. The linear reflecting polarizer 64 then reflects the image beam toward the achromatic retarder 70 and the rear mirror 60, and then allows the reflected p-polarized light to pass to the display surface 52.

Figure 10:
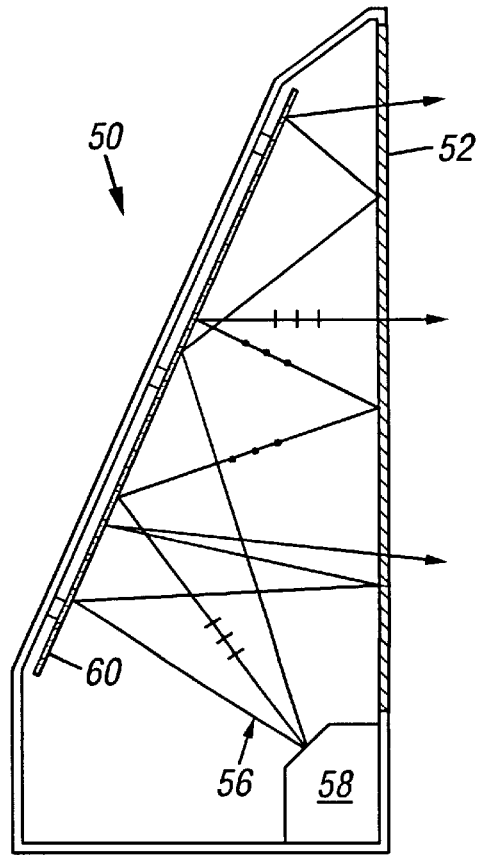

Referring to FIG. 10, the "extra folded" projection display system 50 may be folded even further by allowing the image beam to reflect (or "bounce")from the rear mirror 60 twice, instead of the single bounce shown in FIG. 3. In this embodiment, the image source 58 projects p-polarized light directly toward the rear mirror 60. After reflecting from the mirror 60 and passing through the achromatic retarder twice, the light in the image beam 56 has s-polarization. The s-polarized light then reflects from the linear reflecting polarizer on the screen 52 back toward the rear mirror 60. Another reflection from the mirror 60 and two additional passes through the achromatic retarder direct the image beam, which again contains p-polarized light, back toward the screen 52, where the light passes through the linear reflecting polarizer to form images on the imaging screen 52.

Figure 11A:
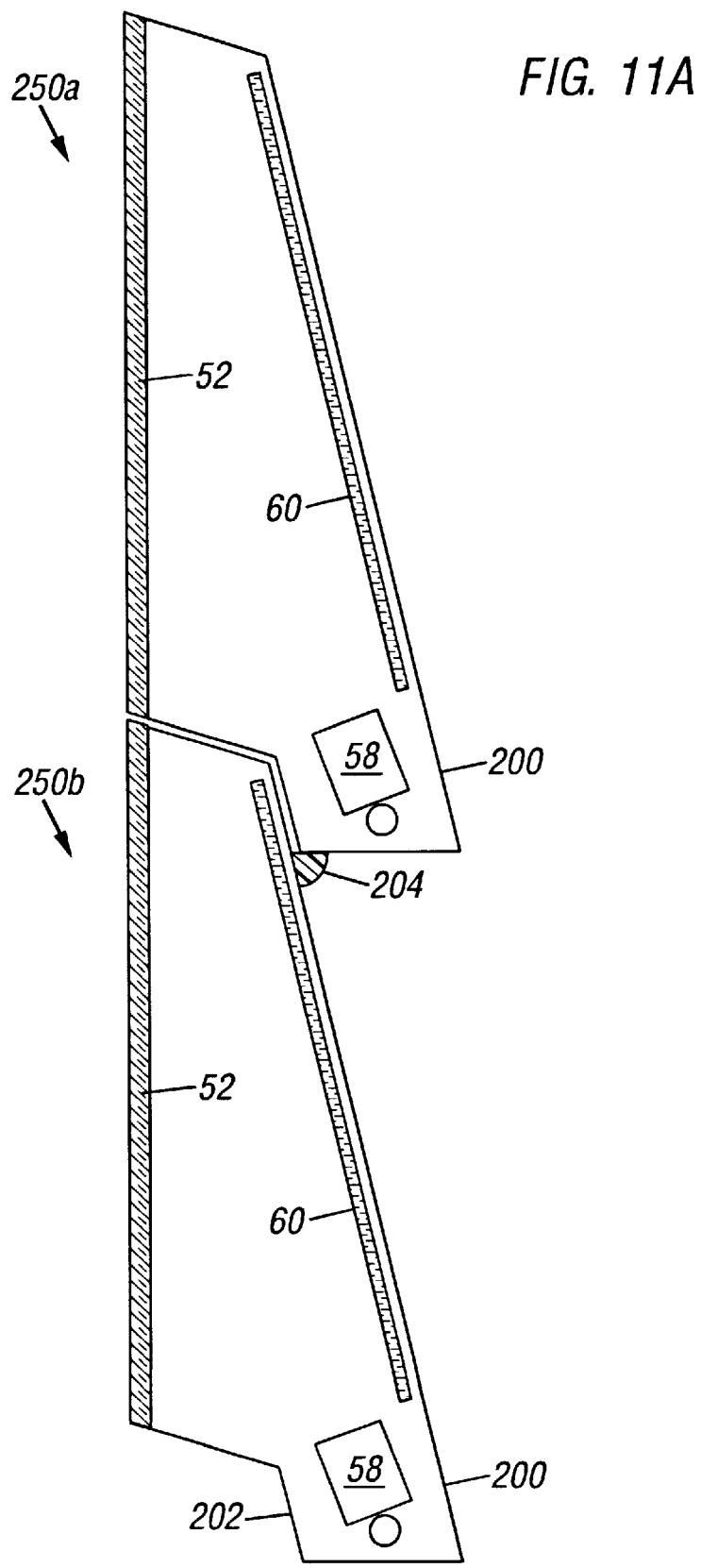
FIGS. 11A and 11B are side and front views of a configuration of multiple projection video systems of FIG. 8.
Figure 11B:
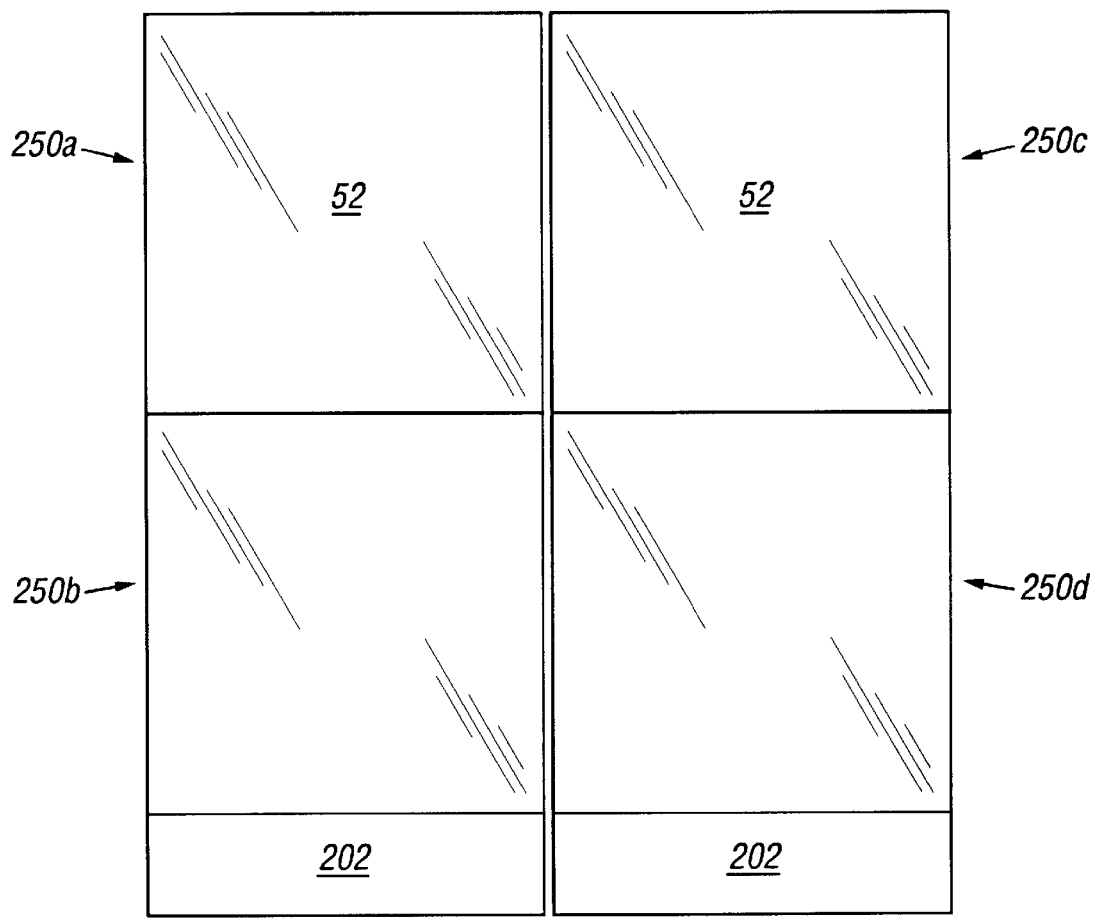

FIG. 11A is a side view of an arrangement of multiple units of the projection display system 50 of FIG. 8. Each unit 250a, 250b includes an outer housing 200. The housing 200 mounts the screen 52, the mirror 60, and the image projector 58 in the proper positions. The bottom front surface 202 of the housing 200 is recessed below the screen 52 to allow stacking, as shown in FIG. 11A, so that the screens 52 of the units 250a, 250b are substantially coplanar. A support 204 mounted on the back surface of the lower unit 250b holds the upper unit 250a in place. Referring to FIG. 11B, the front view of the arrangement is shown. As can be seen, the screen 52 is approximately the width of the unit 250a, so that there is very little border. As a result, a plurality of units 250a–250d can be arranged in an array or "tiled" configuration with very little gap between individual units.

Figure 12A:
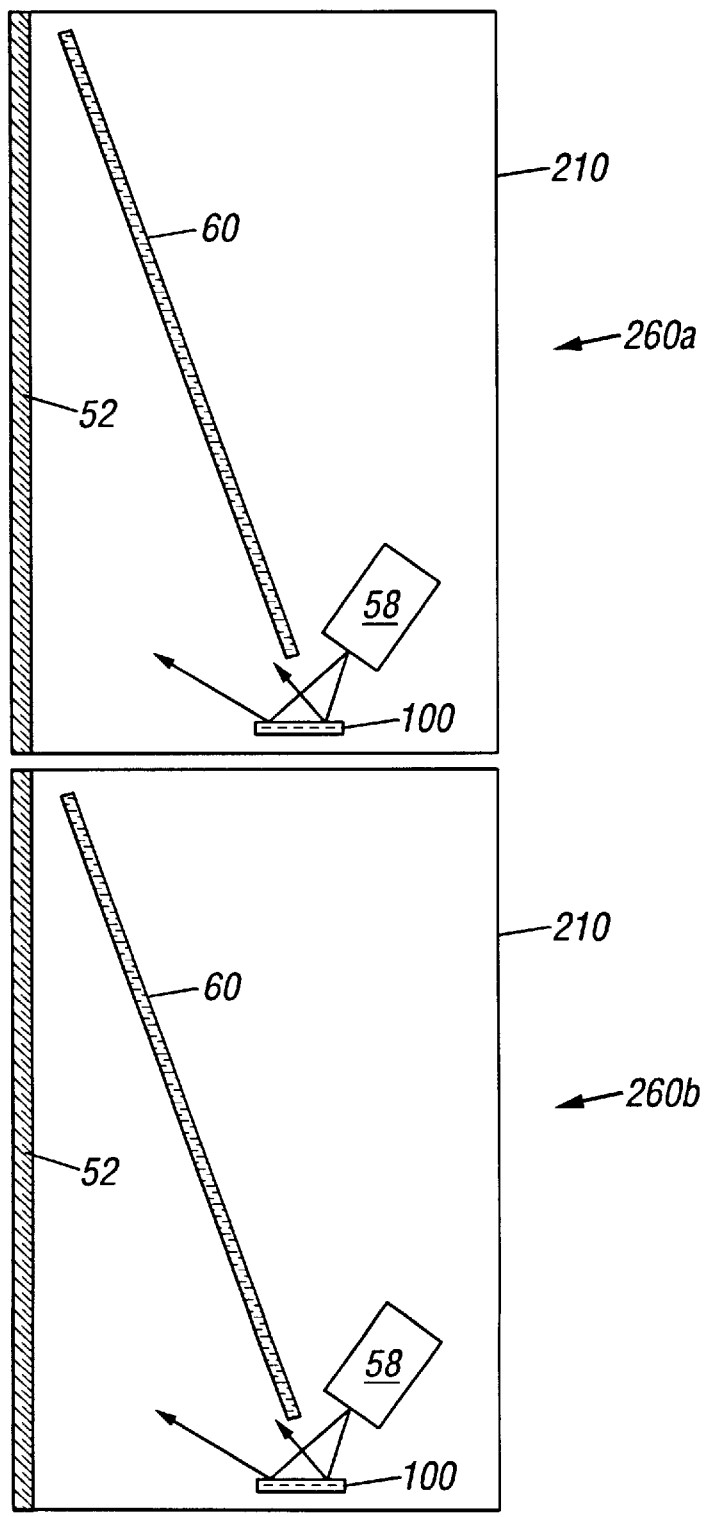
FIGS. 12A and 12B are side and front views of a configuration of multiple projection video systems of FIG. 9.
Figure 12B:
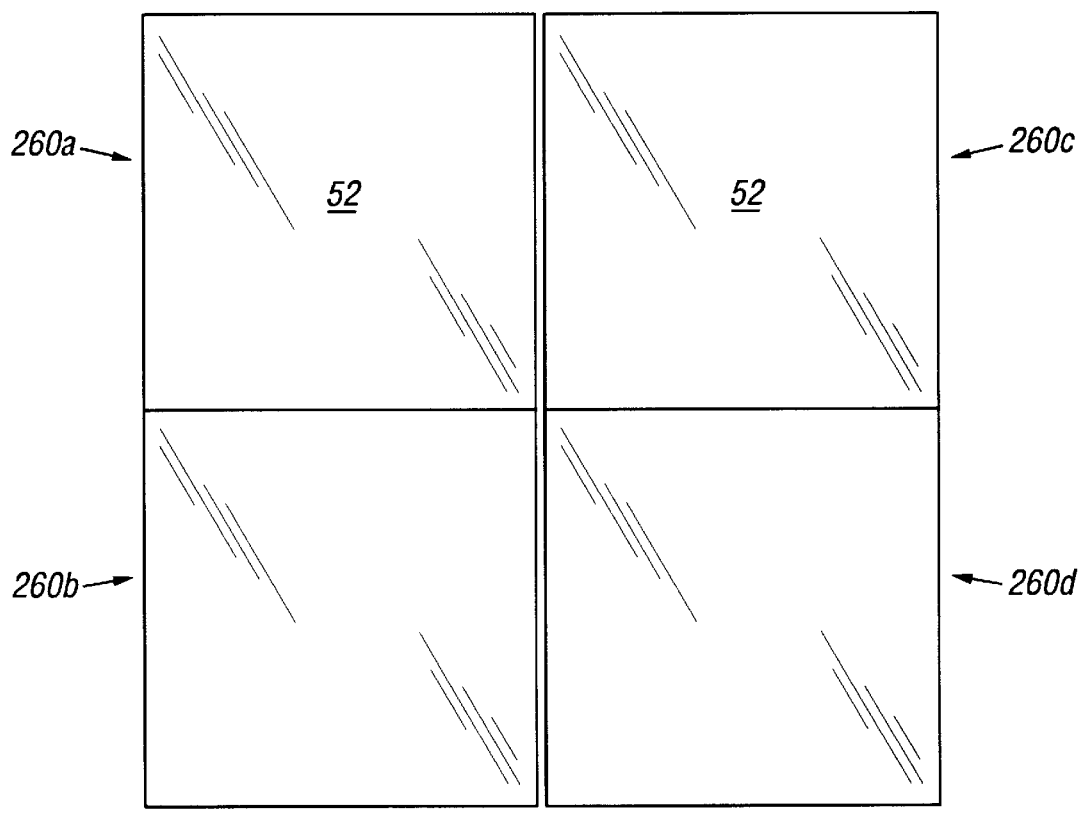

FIG. 12A is a side view of an arrangement of multiple units of the projection display system 50 of FIG. 9. Each unit 260a, 260b includes an outer housing 210. In this instance, the outer housing is substantially a rectangular parallelepiped, unlike the recessed and angled shape of housing 200 in FIG. 11A. However, the imaging screen 52 goes to substantially the edge of the housing 210 on all four sides, without a recessed surface 202 as in housing 200 (FIGS. 11A and 11B). FIG. 12B is the front view of the arrangement of FIG. 12A. The design of FIG. 9 thus has trade offs with the design of FIG. 8 relating to depth and base dimensions, with the final use affecting the choice of designs.

Figure 13:
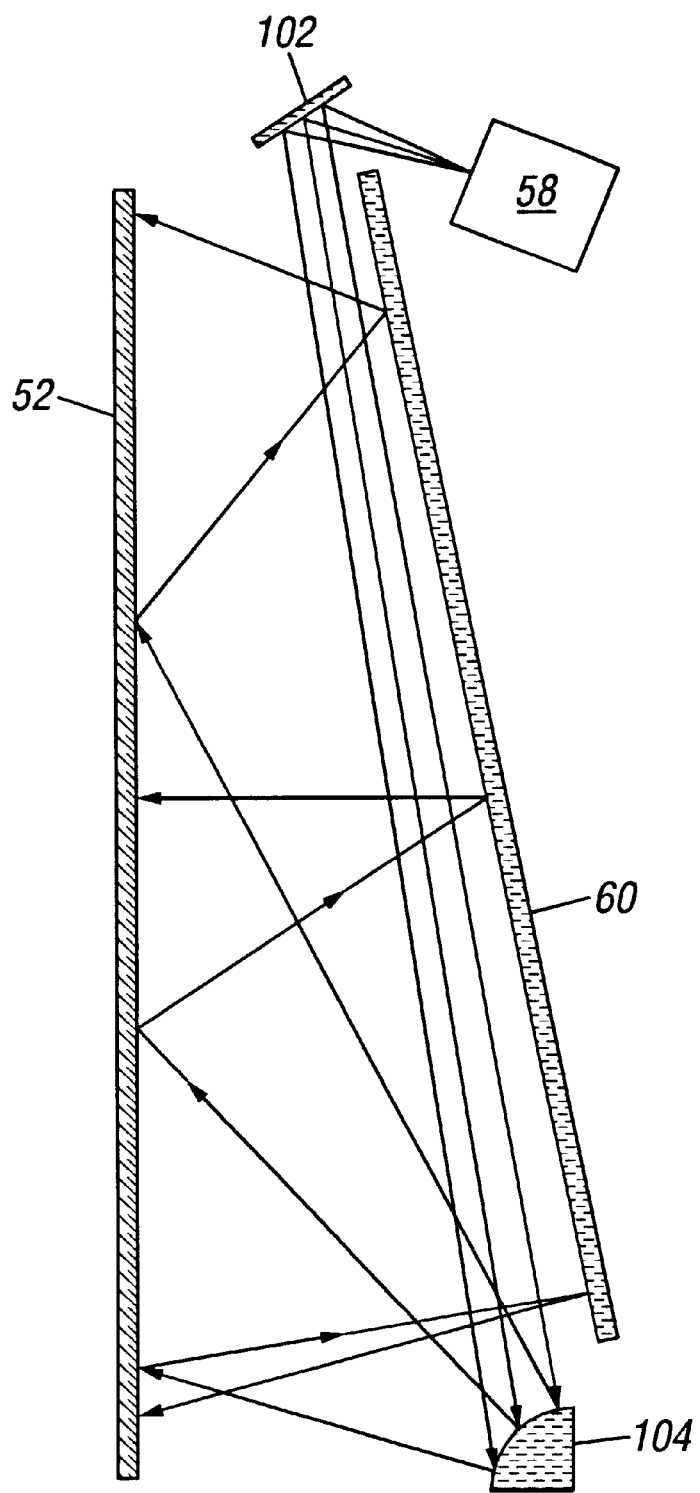
FIGS. 13, 14A, and 14B are side views of alternative "extra-folded" projection video systems with powered optical devices.
Figure 14A:
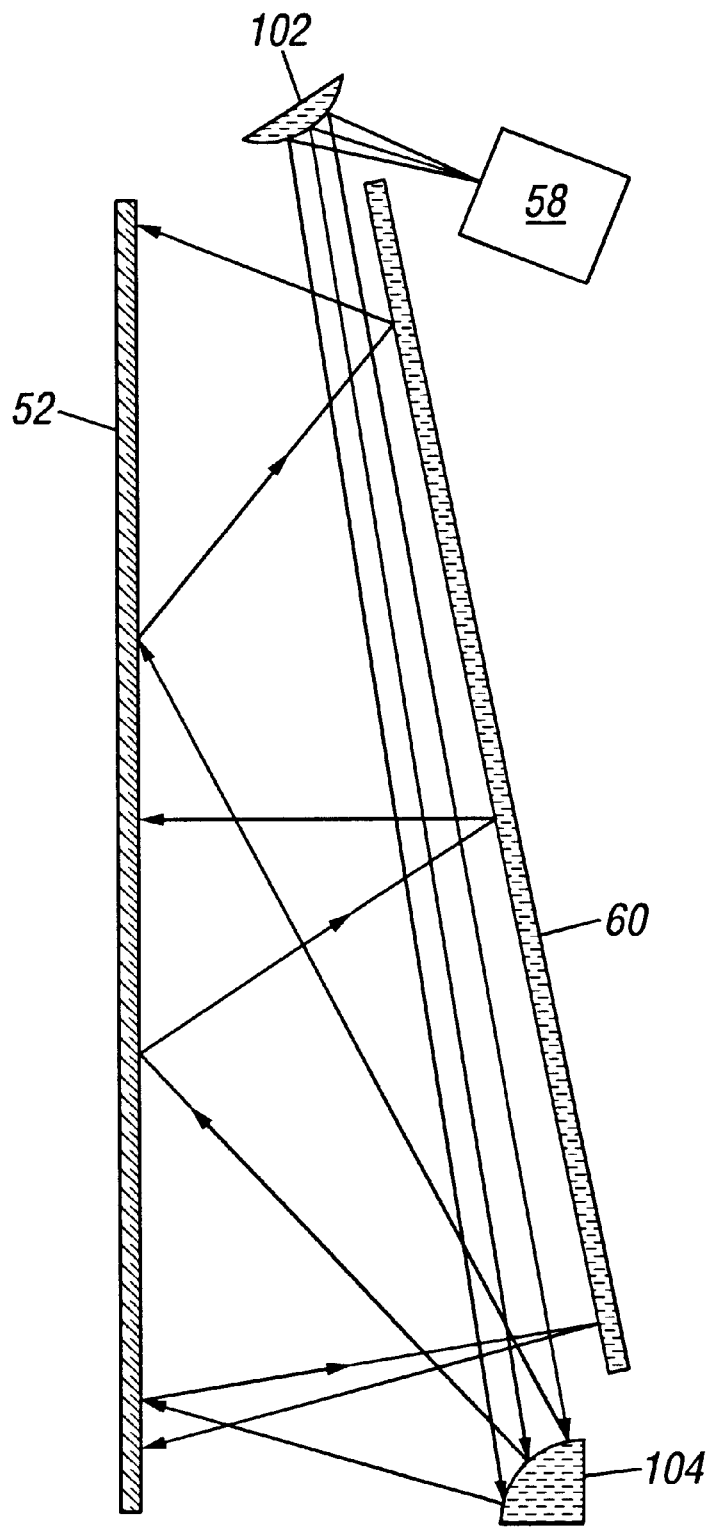
Figure 14B:
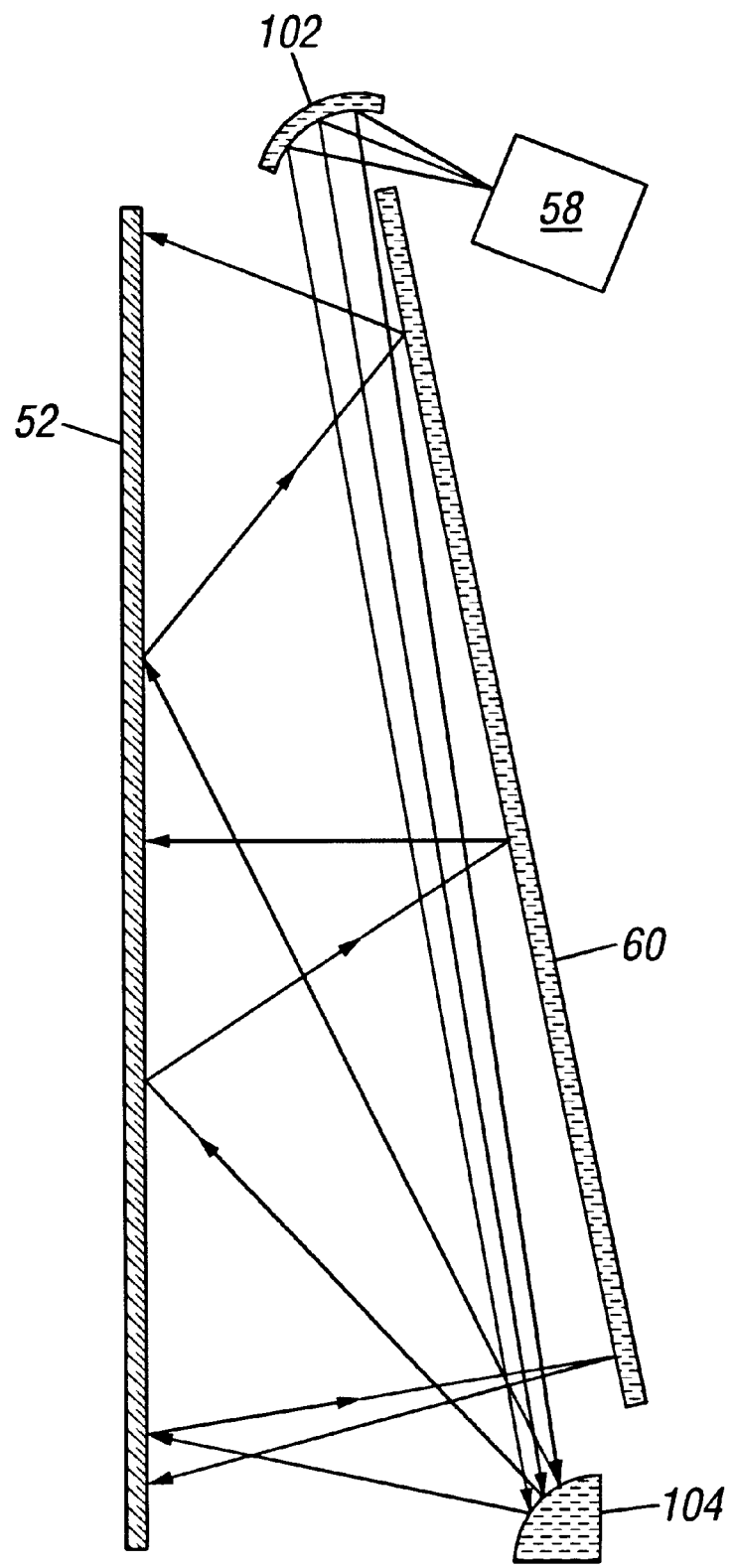

Referring to FIG. 13, in another alternative embodiment, the image source 58 is placed behind the rear mirror 60 near the top of the projection system. In this arrangement, the image source 58 projects the image beam upward onto a small mirror 102 at the top of the projection system. The small mirror 102 in turn reflects the image beam downward and onto a larger mirror 104 located at the bottom of the projection system. To prevent the image beam from diverging too rapidly between the image source 58 and the lower mirror 104, the image source 58 projects the image beam with only slight divergence (or magnification). As a result, the lower mirror 104 is a "powered" optical device that magnifies the image beam as it reflects the beam toward the linear reflecting polarizer 64. The lower mirror 104 magnifies the image beam enough to fill the entire surface of the imaging screen after reflecting once from the linear reflecting polarizer 64 and once from the rear mirror 60. The upper mirror 102 also may be a "powered" optical device, as shown in FIG. 14A. Alternatively, the upper mirror may be a "negatively powered" optical device that causes the image beam to converge until it reaches the lower mirror 104, as shown in FIG. 14B.

Figure 15:
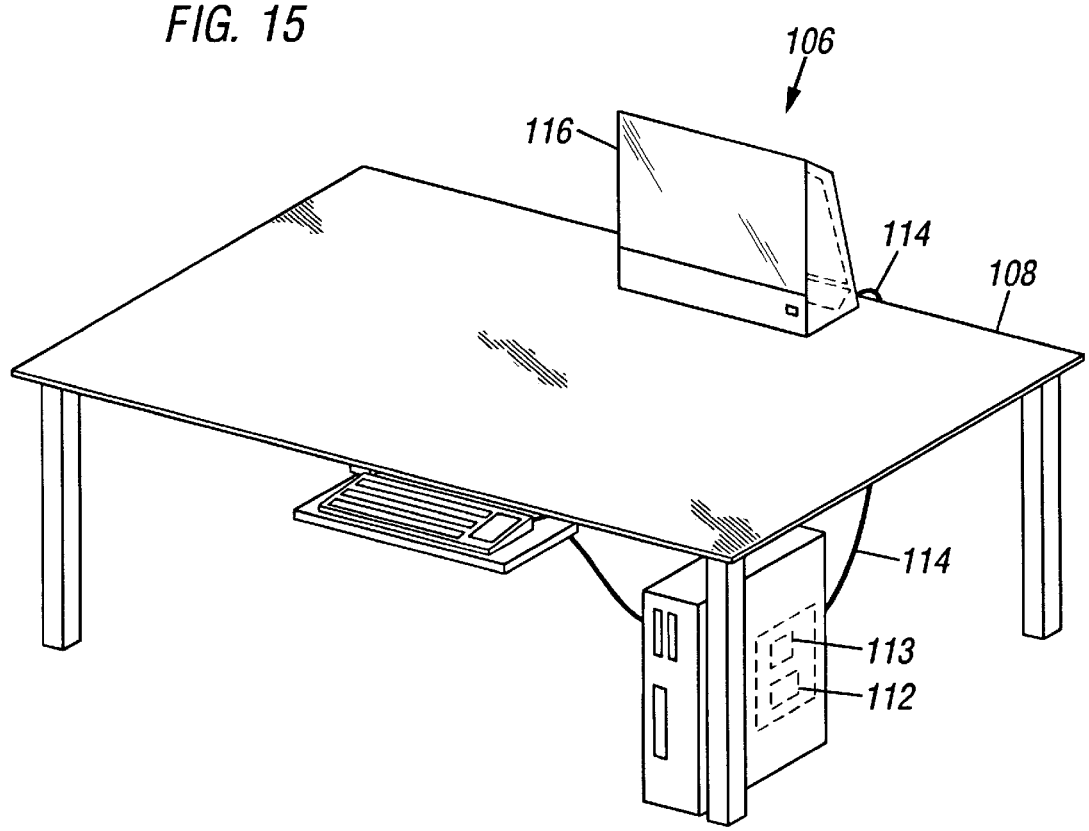
FIG. 15 is a computer system having an "extra-folded" projection video display.

Referring to FIG. 15, an "extra-folded" image projection system may be incorporated into a computer display 106 small enough for use with a desktop computer 108. Like conventional CRT or LCD panel displays, the projection display subsystem 106 may be driven by a conventional CPU 112 and video controller 113 that provide video data to the projection display subsystem 106 through a standard video cable 114. Because the screen 116 is used as a "mirror" to "fold" the video image into a very small area, the projection display subsystem 106 combines the benefits of flat screen technology and projection video yet requires only a small area on the desktop.

Other embodiments are within the scope of the following claims. For example, the video projection system may be incorporated into many types of video display systems, such as small and large screen televisions, laptop and desktop computers, overhead projectors, movie theaters, and holographic imaging systems.

What is claimed is:

1. An apparatus for displaying an image projected by an image source comprising:

an imaging screen, a linear reflecting polarizer positioned in parallel with the imaging screen and substantially coextensive with the imaging screen, an optical image path which reaches the linear reflecting polarizer twice on its way to the imaging screen, the linear reflecting polarizer at one time reflecting the image travelling along the optical path away from the imaging screen and at a different time transmitting the image onto the imaging screen, and a retarder positioned such that the optical path reaches the retarder twice after the image is reflected from the linear reflecting polarizer, the retarder having an effective retardation of ½ wavelength for the two passes through the retarder.

2. The apparatus of claim 1 wherein the linear reflecting polarizer is affixed to the imaging screen.

3. The apparatus of claim 1 further comprising a linear absorption polarizer interposed across the optical path.

4. The apparatus of claim 1 further comprising a linear absorption polarizer interposed in the optical path between the image source and the linear reflecting polarizer.

5. The apparatus of claim 1 further comprising a reflective device located in the optical path prior to the linear reflecting polarizer.

6. The apparatus of claim 5 wherein the reflective device is a powered optical element.

7. The apparatus of claim 5 further comprising a second reflective device located in the optical path prior to the linear reflecting polarizer.

8. The apparatus of claim 7 wherein the second reflective device is a powered optical element.

9. The apparatus of claim 1 wherein the imaging screen has an outer periphery and the optical device, the optical path, and the image source are located within the outer periphery and behind the imaging screen.

10. The apparatus of claim 1 wherein the image source receives video data in the format of electrical signals.

11. The apparatus of claim 10 further comprising a computer including a video controller providing the video data to the image source.

12. A method for displaying images in a projection display system, the method comprising:
   projecting an image toward an imaging screen,
   reflecting the image from a linear reflecting polarizer positioned in parallel and substantially coextensive with the imaging screen, and thereafter
   reflecting the image back toward the imaging screen,
   twice passing the image through a retarder, the retarder having an effective retardation of ½ wavelength for the two passes through the retarder, and
   passing the image through the linear reflecting polarizer onto an imaging surface.

13. The method of claim 12 further comprising polarizing the image prior to reflection from the linear reflecting polarizer.

14. The method of claim 12 further comprising reflecting the image a first time prior to reflection from the linear reflecting polarizer.

15. The method of claim 14 wherein the first reflection is powered.

16. The method of claim 14 further comprising reflecting the image a second time prior to reflection from the linear reflecting polarizer.

17. The method of claim 16 wherein the second reflection is powered.

18. The method of claim 12 further comprising converting electrical signals providing video data to form the image which is projected.

19. A video display system comprising:
   an image source that projects an image having light of a first linear polarization,
   an imaging screen on which the image is to be displayed, and
   along an optical path between the image source and the imaging screen:
      a linear reflecting polarizer positioned parallel to, affixed to, and substantially coextensive with the imaging screen to reflect light having the first linear polarization and to transmit light having a second linear polarization orthogonal to the first linear polarization,
      a reflective device positioned to redirect light reflected from the linear reflecting polarizer back toward the linear reflecting polarizer, and
      a retarder positioned between the linear reflecting polarizer and the reflective device to rotate the polarization of the light reflected from the linear reflecting polarizer from the first linear polarization to the second linear polarization, the retarder having an effective retardation of ½ wavelength for the two passes through the retarder.

20. The apparatus of claim 1 wherein the retarder is a ¼ wavelength retarder.

21. The method of claim 12 wherein the retarder is a ¼ wavelength retarder.

* * * * *